March 3, 1959  M. J. GLADD  2,875,539
ILLUMINATED LICENSE PLATE
Filed Dec. 13, 1957
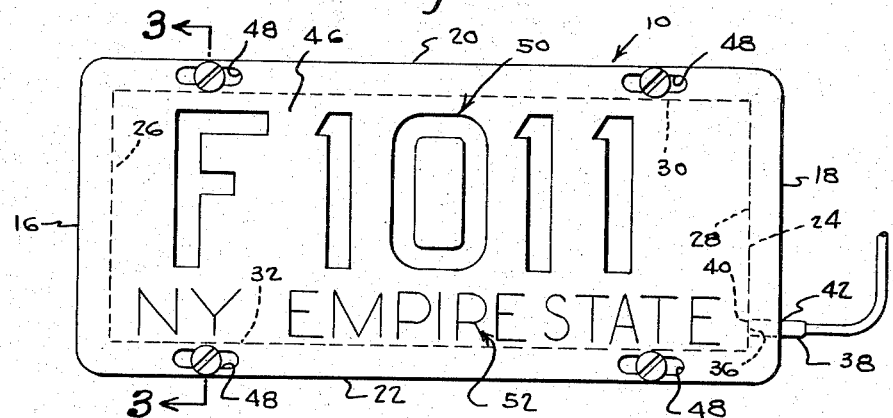
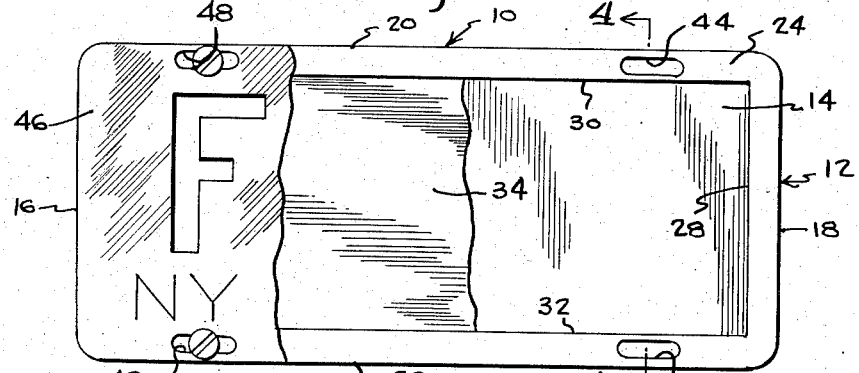
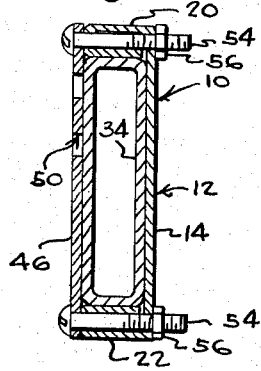 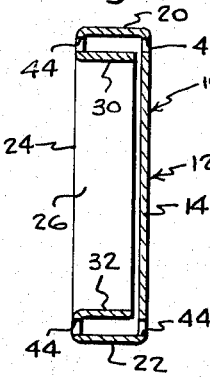 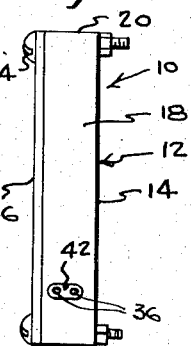
INVENTOR.
MONROE J. GLADD
BY
McMorrow, Berman & Davidson
ATTORNEYS

United States Patent Office 2,875,539
Patented Mar. 3, 1959

2,875,539

ILLUMINATED LICENSE PLATE

Monroe J. Gladd, Saranac Lake, N. Y.

Application December 13, 1957, Serial No. 702,682

1 Claim. (Cl. 40—133)

This invention relates to illuminated license plates and, more specifically, the invention pertains to an illuminated license plate adapted to be displayed on motor vehicles or other conveyances.

One of the primary objects of this invention is to provide an illuminated license plate of the character referred to above which will be clearly visible to a law enforcement officer or other person during both day and night, numerals of the license plate being adapted for display in various colors so as to distinguish between the license plates of the several state jurisdictions or of foreign countries.

A further object of this invention is to provide an illuminated license plate of the type referred to supra, wherein the power for the illumination is supplied by way of the electrical system of the motor vehicle.

A still further object of this invention is to provide an illuminated license plate of the character described above which includes an indicia bearing plate in combination with an electric discharge type illuminating device.

This invention contemplates, as a still further object thereof, the provision of an illuminated license plate which is non-complex in construction and assembly, inexpensive to manufacture, and durable in use.

Other and further objects and advantages of the instant invention will become more evident from a consideration of the following specification when read in conjunction with the annexed drawing, in which:

Figure 1 is a front elevational view of an illuminated license plate constructed and assembled in accordance with the teachings of the present invention;

Figure 2 is a view similar to that of Figure 1, certain portions of the license plate being broken away or omitted in order to more clearly illustrate the structure of the device;

Figure 3 is a transverse detail cross-sectional view of the illuminated license plate, Figure 3 being taken substantially along the vertical plane of line 3—3 of Figure 1, looking in the direction of the arrows;

Figure 4 is a transverse detail cross-sectional view of the illuminated license plate, Figure 4 being taken substantially on the vertical plane of line 4—4 of Figure 2, looking in the direction of the arrows, this view illustrating the constructional details of the holder member per se; and, Figure 5 is an end elevational view of the illuminated license plate, the electrical connecting plug being disconnected therefrom.

Referring now more specifically to the drawing, reference numeral 10 designates, in general, an illuminated license plate constructed in accordance with the present invention. The plate 10 comprises an elongated, substantially rectangular, tray-shaped, holder member 12 having an elongated, substantially rectangular back plate 14, and integral therewith and perpendicular with respect thereto a pair of opposed, elongated, substantially rectangular outer end members 16, 18, and a pair of opposed elongated, substantially rectangular outer side members 20, 22. As is seen in the drawing, the adjacent ends of the outer end members 16 and 18 are integrally connected wtih the respective ends of the outer side members 20, 22. The frontal face of the holder member 12 comprises a continuous, integral extension 24 of the end members 16, 18 and the side members 20, 22, the frontal face being disposed in substantially parallel relation with respect to the back plate 14. The frontal face has integrally connected therewith and depending therefrom a pair of opposed, elongated, substantially rectangular inner end flanges 26, 28 and a pair of opposed, substantially rectangular inner side flanges 30, 32. As in the case of the outer side and end members previously described, the adjacent pairs of ends of the flanges 26, 28 are integrally connected with the adjacent pairs of ends of the inner side flanges 30, 32. The holder 12 comprising reference numerals 14 through 32 may be formed by casting or stamping, all parts thereof being integral with one another, and the holder member 12 may be formed of plastic materials, metal, or of any other suitable materials.

An elongated, substantially hollow rectangular illuminating member 34 comprising a neon bulb or other electric discharge type lighting devices, or incandescent lighting means, is adapted to be mounted within the holder 14, the bulb 34 having an outer dimension so designed as to nest or telescope within the opening defined by the inner end flanges 26, 28 and the inner side flanges 30, 32 of the holder 12. After being thus inserted, the bulb 34 is permanently fused to the inner end flanges 26, 28 and to the inner side flanges 30, 32 by conventional means in order to make the bulb and frame one compact unit. In manufacture, the bulb is filled with various neon gases which will radiate different colors in order to provide means for distinguishing the license plates of various state jurisdictions or countries. The illuminating member 34 is provided with an electric socket 36 which is adapted to receive a power source connector 38, the connecting members 36, 38 being of a conventional design. As is seen in the drawing, the inner end flange 26 and the outer end 28 of the holder member 12 are provided with axially aligned and confronting openings 40, 42 for the reception of the power source connector 38 therethrough.

The frontal face 24 and the back 14 of the holder member 12 are provided with a series of spaced, axially aligned, elongated screw receiving slots 44 which extend therethrough for a purpose to be described below.

The license plate element 46 comprises an elongated, substantially rectangular rigid plate having substantially the same peripheral dimensions as the frontal face 24 of the holder member 12, so that when the plate 46 is placed over the frontal face 24 their respective outer edges are substantially congruent with respect to one another. Also, the plate portion or element 46 is provided with a series of spaced, elongated screw receiving slots 48 formed therein and extending therethrough which substantially conform in location to the slots 44 formed in the holder member 12 when the plate 46 and the frontal face 24 are disposed in juxtaposition. Suitable indicia such as the license numerals 50 extend transversely through the plate element 46, and if desired, the name of the state issuing the license may be imprinted thereon as is indicated at 52.

The illuminating member 34 is fused into the holder 12 with the socket 36 in open communication with the openings 40, 42 of the holder member 12. Then, the license plate element 46 is positioned in such a manner that the slots 48 formed therein are aligned with and are in registry with the slots 44 formed in the holder member 12. When thus positioned, screws 54 are inserted therethrough and are fixedly connected by means of nuts 56, the screws 54 and the nuts 56 being of conventional design. With the device thus assembled the same is mounted on a vehicle by any conventional means (not shown) and the connector 38 leading from the vehicle electrical power source is inserted into the socket 36. The preferable electrical circuit (not shown) is such that the bulb 34 is energized whenever the vehicle electrical power source is made operative by turning the ignition switch to its "on" position. The light from the bulb 34 will radiate through the license numeral openings 50 cut into the plate 46 to effect illumination of the license indicia so that the same are rendered visible at a great distance either at day or night time. It is to be understood, of course, that the license plate element 46 is formed of an oqaque or non-light transmitting material.

Having described and illustrated one embodiment of this invention in detail, it will be understood that the same is offered merely by way of example, and that the instant invention is to be limited only by the scope of the appended claim.

What is claimed is:

A license plate assembly comprising an open housing including a back plate, said back plate having a continuous peripheral first flange projecting from one side thereof, said peripheral first flange adjacent the outer end thereof being inclined to form a continuous peripheral front panel substantially parallel to said back plate and a continuous second flange extending from said front panel and disposed in spaced confronting relationship relative to said first flange and forming a passageway therebetween, said first and second flanges forming a substantially hollow double walled housing for an illumination source, a source of illumination in said double walled housing, a perforate license plate superimposed over said front panel, said front panel and said back plate each having a plurality of spaced axially aligned slots formed therein, said license plate having a plurality of slots formed therein registrable with said slots of said front panel, and securing means in said slots passing between said double walls for clamping said license plate in said housing.

References Cited in the file of this patent
UNITED STATES PATENTS

| | | |
|---|---|---|
| 1,280,452 | Halleran | Oct. 1, 1918 |
| 1,546,321 | Smith | July 14, 1925 |
| 1,665,276 | Pfeifer | Apr. 10, 1928 |
| 1,696,804 | Lapierre | Dec. 25, 1928 |
| 1,724,584 | Hendry | Aug. 13, 1929 |
| 1,906,516 | Benson | May 2, 1933 |
| 1,961,735 | Braun | June 5, 1934 |
| 2,579,230 | Giboney | Dec. 18, 1951 |
| 2,608,013 | Marsala | Aug. 26, 1952 |
| 2,618,089 | Rose | Nov. 18, 1952 |